(12) United States Patent
Tao et al.

(10) Patent No.: US 10,409,752 B2
(45) Date of Patent: Sep. 10, 2019

(54) BIDIRECTIONAL SIGNAL CONDITIONING CHIP INCLUDING PROCESSOR DETERMINING DATA TRANSMISSION DIRECTION AND TYPE OF TRANSMITTED DATA OF USB TYPE-C CABLE AND USB TYPE-C CABLE INCLUDING THE SAME

(71) Applicant: LONTIUM SEMICONDUCTOR CORPORATION, Hefei, Anhui (CN)

(72) Inventors: Cheng Tao, Anhui (CN); Yu Chen, Anhui (CN); Xi Xu, Anhui (CN); Xin Zhu, Anhui (CN)

(73) Assignee: LONTIUM SEMICONDUCTOR CORPORATION, Anhui (CN)

( * ) Notice: Subject to any disclaimer, the term of this patent is extended or adjusted under 35 U.S.C. 154(b) by 0 days.

(21) Appl. No.: 15/783,424

(22) Filed: Oct. 13, 2017

(65) Prior Publication Data

US 2019/0073329 A1   Mar. 7, 2019

(30) Foreign Application Priority Data

Sep. 7, 2017   (CN) .......................... 2017 1 0801163

(51) Int. Cl.
| | |
|---|---|
| *G06F 13/38* | (2006.01) |
| *G06F 5/06* | (2006.01) |
| *G06F 13/16* | (2006.01) |
| *G06F 13/42* | (2006.01) |
| *G09G 3/20* | (2006.01) |

(52) U.S. Cl.
CPC ............ *G06F 13/385* (2013.01); *G06F 5/065* (2013.01); *G06F 13/1673* (2013.01); *G06F 13/4282* (2013.01); *G09G 3/2096* (2013.01); *G06F 2205/067* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2015/0212497 A1* | 7/2015 | Dunstan .................... | G06F 1/26 307/130 |
| 2016/0188514 A1* | 6/2016 | Forghani-Zadeh ... | G06F 13/385 710/313 |

(Continued)

OTHER PUBLICATIONS

"HDMI 1.4b Alt Mode on USB Type-C Specification," HDMI Licensing, LLC; pp. 1-26, Version 1.0; Sep. 15, 2016.
(Continued)

*Primary Examiner* — Raymond N Phan
(74) *Attorney, Agent, or Firm* — Cantor Colburn LLP

(57) ABSTRACT

A bidirectional signal conditioning chip for a USB Type-C cable and a USB Type-C cable are provided. The chip includes a memory, a processor and a transfer driver. The transfer driver is configured to regenerate and transmit a high speed signal; the memory is configured to store a program code; the processor is configured to call the program code, and perform the following operations when the program code is executed: determining a data transmission direction and a type supported by transmitted data of the USB Type-C cable; configuring on-off states of buffers in the transfer driver based on the data transmission direction and the supported type, so that a data output direction of the transfer driver is consistent with the data transmission direction.

15 Claims, 7 Drawing Sheets

(52) U.S. Cl.
CPC ............... *G06F 2213/0026* (2013.01); *G06F 2213/0042* (2013.01); *G09G 2370/12* (2013.01)

(56) References Cited

U.S. PATENT DOCUMENTS

| | | | |
|---|---|---|---|
| 2016/0217307 A1* | 7/2016 | Huang | G06F 13/385 |
| 2017/0046289 A1* | 2/2017 | Hundal | G06F 13/385 |
| 2017/0293333 A1* | 10/2017 | Liu | G06F 1/266 |
| 2017/0351638 A1* | 12/2017 | Chen | G06F 13/385 |
| 2018/0009666 A1* | 1/2018 | Hundal | G06F 13/385 |
| 2018/0018295 A1* | 1/2018 | Chen | G06F 13/4282 |
| 2018/0143916 A1* | 5/2018 | Gupta | G06F 13/102 |

OTHER PUBLICATIONS

"Universal Serial Bus Power Delivery Specification," USB Power Delivery Specification Revision 2.0; Apr. 3, 2015, pp. 1-534, Version 1.0.
"Universal Serial Bus Type-C Cable and Connector Specification" USB 3.0 Promotor Group; pp. 1-221, Release 1.2, Mar. 25, 2016.
"VESA DisplayPort Alt Mode on USB Type-C Standard," VESA; pp. 1-114, Version 1.0,Sep. 22, 2014.

* cited by examiner

USB Type-C Connector Interface

| Pin | Name | Description | | Name | Pin |
|-----|------|-------------|---|------|-----|
| A12 | GND | Ground | | GND | B1 |
| A11 | RX2+ | USB3.1 RX2 Differential Pair | USB3.1 TX2 Differential Pair | TX2+ | B2 |
| A10 | RX2- | | | TX2- | B3 |
| A9 | VBUS | USB Type-C Power | | VBUS | B4 |
| A8 | SBU1 | Sideband Use Channel-1 | Configuration Channel-2 | CC2 | B5 |
| A7 | D- | USB2.0 Differential Pair | | D+ | B6 |
| A6 | D+ | | | D- | B7 |
| A5 | CC1 | Configuration Channel-1 | Sideband Use Channel-2 | SBU2 | B8 |
| A4 | VBUS | USB Type-C Power | | VBUS | B9 |
| A3 | TX1- | USB3.1 TX1 Differential Pair | USB3.1 RX1 Differential Pair | RX1- | B10 |
| A2 | TX1+ | | | RX1+ | B11 |
| A1 | GND | Ground | | GND | B12 |

USB Type-C Plug Interface

| Pin | Name | Description | | Name | Pin |
|-----|------|-------------|---|------|-----|
| A1 | GND | Ground | | GND | B12 |
| A2 | TX1+ | USB3.1 TX1 Differential Pair | USB3.1 RX1 Differential Pair | RX1+ | B11 |
| A3 | TX1- | | | RX1- | B10 |
| A4 | VBUS | USB Type-C Power | | VBUS | B9 |
| A5 | CC | Configuration Channel | Sideband Use Channel-2 | SBU2 | B8 |
| A6 | D+ | USB2.0 Differential Pair | N.C. | | B7 |
| A7 | D- | | | | B6 |
| A8 | SBU1 | Sideband Use Channel-1 | Power for Powered-Cable | VCONN | B5 |
| A9 | VBUS | USB Type-C Power | | VBUS | B4 |
| A10 | RX2- | USB3.1 RX2 Differential Pair | USB3.1 TX2 Differential Pair | TX2- | B3 |
| A11 | RX2+ | | | TX2+ | B2 |
| A12 | GND | Ground | | GND | B1 |

Figure 2

BIDIRECTIONAL SIGNAL CONDITIONING CHIP INCLUDING PROCESSOR DETERMINING DATA TRANSMISSION DIRECTION AND TYPE OF TRANSMITTED DATA OF USB TYPE-C CABLE AND USB TYPE-C CABLE INCLUDING THE SAME

CROSS REFERENCE TO RELATED APPLICATION

The present invention claims priority under 35 U.S.C. § 119 to Chinese Patent Application No. 201710801163.3, filed on Sep. 7, 2017, the entire contents of which being incorporated herein by reference.

FIELD

The present disclosure relates to the technical field of signal processing, and in particular to a bidirectional signal conditioning chip for a USB Type-C cable and a USB Type-C cable.

BACKGROUND

The virtual reality technology VR refers to a technology that a three-dimensional environment is generated by means of a computer system and sensor technology, so as to create a novel human-machine interaction mode, so that a user enjoys a more realistic and immersive experience by senses such as vision, audition, touch and olfaction. The augmented reality technology AR is a technology that a position and an angle of a camera image are calculated in real time and a corresponding image, video and 3D model are integrated thereto, where an object of the technology is to embed a virtual world into the real world on a screen and interact with the virtual world.

Developments of the VR technology and the AR technology promote a video transmission rate and a video display quality. A video signal is transmitted between a signal source and a helmet display of a current split-type VR/AR device mainly via HDMI and DP. However, wires for traditional HDMI and DP are not lightweight enough, and extra two or three cables are required to transmit sensor signals and provide power and so on. Accordingly, the helmet device of the current split-type VR/AR tends to be very clunky and cannot provide good interaction performance for the user, thereby seriously affecting the experience of the user. Though there also are VR/AR products using wireless connection, due to rigid requirements on a data bandwidth, transmission delay, reliability and the like, the wireless connection of the VR/AR product, which has a low data rate at present and is susceptible to interference, tends to be limited in the field of the split-type VR/AR application.

USB Type-C is a newest USB interface formulated by the USB IF organization, has a capability of forward and reverse plugging and supplying high power, and can transmit multiple video protocols such as DP, HDMI and MHL. The USB Type-C interface can solve the problem of a large number of connection wires of a wire-connected head display device, and can simplify and expand a connection manner between a helmet and a host of the split-type VR/AR product. Multiple cables such as HDMI/DP and USB cables are not required any more, and only one USB Type-C cable can achieve video signal transmission in a higher resolution, provide a more real-time return signal of sensor data, and have a capability of supplying higher power online, and is more lightweight and portable for a terminal user. In addition to simple connection, a high resolution, a high refresh rate and supporting multiple video formats are also advantages of USB Type-C connection. With the USB Type-C, not only it is compatible with 4K30 Hz HDMI1.4b Alternate Mode, but also DP Alternate Mode with a data bandwidth up to 32.4 Gb/s is supported, thereby achieving 3D video transmission with 4K120 Hz or 8K60 Hz.

To provide an enough interaction movement space for the user, a long cable is usually used to connect the host and the helmet of the VR/AR device. However, for video transmission with a high resolution and a high data bandwidth, the long cable results in signal attenuation, thereby affecting a video quality, and causing the VR/AR device to fail to operate in serious conditions. Therefore, to improve a signal quality, it is usually required to add a Re-driver chip integrating an e-Marker function into the USB Type-C cable. In one aspect, a function of a passive EMCA is realized and identification information and various characteristics of the cable are provided to a USB Type-C source. In the other aspect, the attenuation of a high speed signal in the cable can be compensated and a transmission quality of a signal is improved. Such USB Type-C wire is referred to as an active EMCA. Usually, a signal of the Re-driver chip is transmitted in one direction, therefore, a data transmission direction of the cable is usually to be marked in the active EMCA provided with the Re-driver chip, and the cable is required to be connected strictly based on the data transmission direction. Accordingly, it not only results in inconvenience for the user using the VR/AR device, but also adds extra steps to mark the wire for production and manufacturing of the wire.

In summary, an urgent problem to be solved for those skilled in the art is how to solve the problem that it is required to connect a VR/AR device strictly based on the signal transmission direction of the Re-driver chip in a case that the VR/AR device is connected by the active EMCA.

SUMMARY

In view of the above, a bidirectional signal conditioning chip for a USB Type-C cable and a USB Type-C cable are provided according to an embodiment of the present disclosure, so that a signal can be transmitted bi-directionally in the USB Type-C cable.

To achieve the above object, the following technical solutions are provided according to an embodiment of the present disclosure.

A bidirectional signal conditioning chip for a USB Type-C cable is provided, and the chip includes: a memory, a processor and a transfer driver, where the transfer driver is configured to regenerate and transmit a high speed signal from a first end of the USB Type-C cable to a second end of the USB Type-C cable or from the second end of the USB Type-C cable to the first end of the USB Type-C cable;

the memory is configured to store a program code, and the processor is configured to call the program code and is configured to perform, when the program code is executed, operations of:

determining a data transmission direction of the USB Type-C cable;

determining a type supported by transmitted data on the USB Type-C cable; and configuring on-off states of buffers transmitting a data signal in the transfer driver based on the data transmission direction and the type supported by the transmitted data, to control a data output direction of the transfer driver to be consistent with the data transmission direction, where each data transmission line in the bidirectional signal conditioning chip is provided with two buffers in opposite directions.

Preferably, in the above-described bidirectional signal conditioning chip for the USB Type-C cable, the transfer driver may include:

a first A buffer and a first B buffer, arranged between a TX2A±high speed differential pair interface at the first end of the USB Type-C cable and a TX2B±high speed differential pair interface at the second end of the USB Type-C cable, where an input terminal of the first A buffer is connected to the TX2B±high speed differential pair interface, an output terminal of the first A buffer is connected to the TX2A±high speed differential pair interface, an input terminal of the first B buffer is connected to the TX2A±high speed differential pair interface, and an output terminal of the first B buffer is connected to the TX2B±high speed differential pair interface;

a second A buffer and a second B buffer, arranged between an RX2A±high speed differential pair interface at the first end of the USB Type-C cable and an RX2B±high speed differential pair interface at the second end of the USB Type-C cable, where an input terminal of the second A buffer is connected to the RX2B±high speed differential pair interface, an output terminal of the second A buffer is connected to the RX2A±high speed differential pair interface, an input terminal of the second B buffer is connected to the RX2A±high speed differential pair interface, and an output terminal of the second B buffer is connected to the RX2B±high speed differential pair interface;

a third A buffer and a third B buffer, arranged between a TX1A±high speed differential pair interface at the first end of the USB Type-C cable and a TX1B±high speed differential pair interface at the second end of the USB Type-C cable, where an input terminal of the third A buffer is connected to the TX1B±high speed differential pair interface, an output terminal of the third A buffer is connected to the TX1A±high speed differential pair interface, an input terminal of the third B buffer is connected to the TX1A±high speed differential pair interface, and an output terminal of the third B buffer is connected to the TX1B±high speed differential pair interface; and a fourth A buffer and a fourth B buffer, arranged between an RX1A±high speed differential pair interface at the first end of the USB Type-C cable and an RX1B±high speed differential pair interface at the second end of the USB Type-C cable, where an input terminal of the fourth A buffer is connected to the RX1B±high speed differential pair interface, an output terminal of the fourth A buffer is connected to the RX1A±high speed differential pair interface, an input terminal of the fourth B buffer is connected to the RX1A±high speed differential pair interface, and an output terminal of the fourth B buffer is connected to the RX1B±high speed differential pair interface.

Preferably, in the above-described bidirectional signal conditioning chip for the USB Type-C cable, for configuring the on-off states of the buffers transmitting the data signal in the transfer driver based on the data transmission direction and the type supported by the transmitted data, the processor is configured to perform operations of:

in a case that it is detected that data is transmitted from the first end of the USB Type-C cable to the second end of the USB Type-C cable, controlling the first B buffer, the third B buffer, the second A buffer and the fourth A buffer to be turned on and other buffers to be turned off if the type supported by the transmitted data is a first type; controlling the first B buffer, the second B buffer, the third B buffer and the fourth B buffer to be turned on and other buffers to be turned off if the type supported by the transmitted data is a second type, or the type supported by the transmitted data is a third type and a type of Pin Assignment is a C/E type; and controlling the first B buffer, the second B buffer, the third B buffer, and the fourth A buffer to be turned on and other buffers to be turned off if the type supported by the transmitted data is the third type and the type of the Pin Assignment is a D/F type; and in a case that it is detected that the data is transmitted from the second end of the USB Type-C cable to the first end of the USB Type-C cable, controlling the first B buffer, the third B buffer, the second A buffer and the fourth A buffer to be turned on and other buffers to be turned off if the type supported by the transmitted data is the first type; controlling the first A buffer, the second A buffer, the third A buffer and the fourth A buffer to be turned on and other buffers to be turned off if the type supported by the transmitted data is the second type, or the type supported by the transmitted data is the third type and the type of the Pin Assignment is the C/E type; and controlling the first B buffer, the second A buffer, the third A buffer and the fourth A buffer to be turned on and other buffers to be turned off if the type supported by the transmitted data is the third type and the type of the Pin Assignment is the D/F type.

Preferably, in the above-described bidirectional signal conditioning chip for the USB Type-C cable, the second type may be an HDMI1.4b Alt Mode, the third type may be a DP Alt Mode, and the first type may be a type other than the HDMI1.4b Alt Mode and the DP Alt Mode.

Preferably, the above-described bidirectional signal conditioning chip for the USB Type-C cable may further include:

a power transmission protocol monitor configured to perform SOP'/SOP" communication with an SRC port or an SNK port according to a preset specification, to inform the SRC port or the SNK port of a characteristic of the cable;

a first listener configured to listen to transmitted data of a configuration channel, determine a type supported by the transmitted data, and transmit the type supported by the transmitted data to the processor;

a register set configured to configure operation parameters of modules in the bidirectional signal conditioning chip, and perform state storage, state acquisition and interrupt processing statically or dynamically;

a second listener configured to adjust configuration parameters of buffers in an enabled state in the transfer driver in a case that the type supported by the transmitted data is the third type, to control the configuration parameters of the buffers to match the third type;

a third listener configured to adjust the configuration parameters of the buffers in the enabled state in the transfer driver in a case that the type supported by the transmitted data is the second type, to control the configuration parameters of the buffers to match the second type;

a USB3.1 state machine configured to control a USB3.1 interface to perform connection detection, state transition and data transmission, in a case that both DP Alt Mode data and USB3.1 data are transmitted or only the USB3.1 data is transmitted; and an on-chip processor configured to run a pre-stored software program, and configure the operation parameters of the modules in the bidirectional signal conditioning chip, and perform state storage, state acquisition, and interrupt processing via the register set statically or dynamically.

A USB Type-C cable is provided, where a circuit board of the USB Type-C cable is provided with the bidirectional signal conditioning chip for the USB Type-C cable described above.

Preferably, the USB Type-C cable may further include:

a first voltage sampling circuit and a second voltage sampling circuit, where the first voltage sampling circuit is configured to output a high level signal to the processor in a case that data is transmitted from the first end of the USB Type-C cable to the second end of the USB Type-C cable; and the second voltage sampling circuit is configured to output a high level signal to the processor in a case that the data is transmitted from the second end of the USB Type-C cable to the first end of the USB Type-C cable.

Preferably, in the USB Type-C cable, the first voltage sampling circuit may include:

a first A resistor connected to a first isolation diode, where the first isolation diode is one diode of two back-to-back isolation diodes in the circuit board of the USB Type-C cable, and is turned on from the first end of the USB Type-C cable to the second end of the USB Type-C cable; and a second A resistor, where a first terminal of the second A resistor is connected to the first A resistor, a second terminal of the second A resistor is grounded, and a common terminal of the first A resistor and the second A resistor serves as an output terminal of the first voltage sampling circuit;

and the second voltage sampling circuit may include:

a first B resistor connected to a second isolation diode, where the second isolation diode is one diode of the two back-to-back isolation diodes in the circuit board of the USB Type-C cable, and is turned on from the second end of the USB Type-C cable to the first end of the USB Type-C cable; and a second B resistor, where a first terminal of the second B resistor is connected to the first B resistor, a second terminal of the second B resistor is grounded, and a common terminal of the first B resistor and the second B resistor serves as an output terminal of the second voltage sampling circuit.

Preferably, in the USB Type-C cable, at least one of the first voltage sampling circuit and the second voltage sampling circuit may be integrated in the bidirectional signal conditioning chip.

Preferably, in the USB Type-C cable, both the first end and the second end of the USB Type-C cable may be Type-C plugs.

With the above solutions provided according to an embodiment of the present disclosure, the data transmission direction and the type supported by the transmitted data of the USB Type-C cable are detected via a circuit in a USB Type-C circuit board; a detection result of the direction and a detection result of the type are transmitted to the processor; the processor queries, according to a preset mapping rule, a configuration solution of the transfer driver matching the detection results of the direction and the type, after the processor obtains the detection results of the direction and the type; the on-off states of the buffers in the transfer driver are configured according to the configuration solution of the transfer driver, so that the data output direction of the transfer driver is consistent with the data transmission direction; and the configuration parameters of the buffers in the transfer driver are configured according to the configuration solution of the transfer driver, so that parameter configurations of the buffers in the transfer driver are consistent with the type supported by the transmitted data. Therefore, with the USB Type-C cable, bidirectional transmission can be achieved, and a problem of inconvenient in usage for the user generated since the USB Type-C cable can only perform unidirectional data transmission in the conventional technology is solved.

BRIEF DESCRIPTION OF THE DRAWINGS

In order to illustrate technical solutions in the embodiments of the present disclosure or in the conventional technology more clearly, drawings to be used in the description of the embodiments or the conventional technology are introduced briefly hereinafter. Apparently, the drawings described hereinafter merely illustrate some embodiments of the present disclosure, and other drawings may be obtained by those skilled in the art based on these drawings without any creative efforts.

FIG. 2 is a schematic diagram of signal definition of a USB Type-C interface;

DETAILED DESCRIPTION OF THE EMBODIMENTS

The technical solutions according to the embodiments of the present disclosure will be described clearly and completely as follows in conjunction with the drawings in the embodiments of the present disclosure. It is apparent that the described embodiments are only a part rather than all of the embodiments of the present disclosure. Any other embodiments obtained by those skilled in the art based on the embodiments in the present disclosure without any creative efforts fall within the protection scope of the present disclosure.

To facilitate understanding solutions provided according to the present disclosure, key concepts related to the solutions are simply described and illustrated.

A USB Type-C interface is the newest USB interface standard formulated by the USB IF organization, to satisfy a developing trend of emerging consumption electronic platforms and further expand requirements for an ecosystem of USB cables and USB connectors. The USB Type-C interface is specifically customized for emerging products, has a smaller volume than the data charging interface USB 2.0 Micro-B common in traditional mobile phones, supports blind-plugging (a forward or reverse plugging, and a direction of the cable can be reversed) and a higher charge power (up to 100 W @ 20V 5A), and provides Alternate Mode [3,4] to transmit different video data, thereby expanding functions of the interface.

Figure 1:
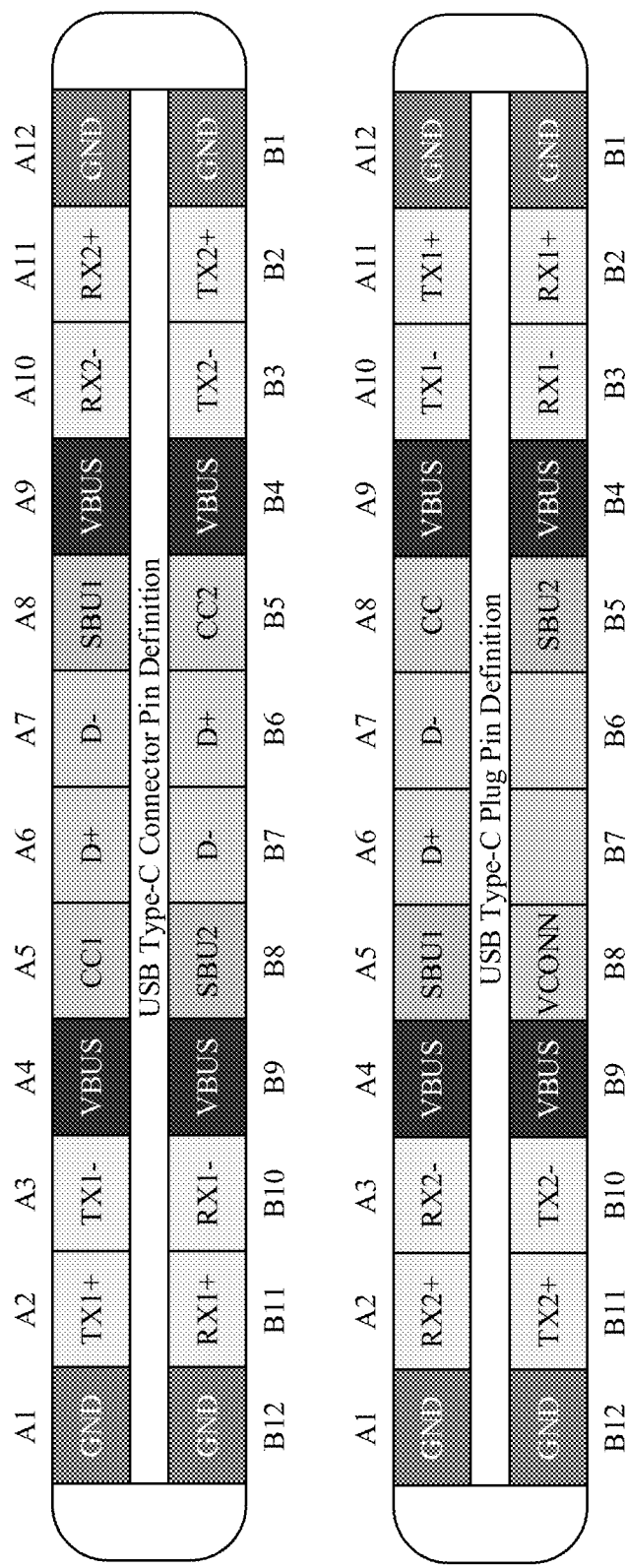
FIG. 1 is a schematic diagram of distribution of a USB Type-C interface.

FIG. 1 and FIG. 2 show signal definition and distribution of the USB Type-C interface (including a receptacle and a plug). A system determines a plugging direction of a current plug by determining which of CC1 and CC2 in a receptacle RECEPTACLE is connected to Configuration Channel (CC, which is a key channel newly added in the Type-C interface and configured to detect USB connection, forward and reverse plugging, and connection establishment and management between data and VBUS) in a plug PLUG, and exchange high speed data channels A2/A3↔B2/B3 and A11/A10↔B11/B10 based on the above information. Once the plugging direction is determined, for example, the CC1 in the receptacle is connected to the CC in the plug of a cable, the CC2 in the receptacle is connected to VCONN in the plug for supplying power to an electronic device in the USB Type-C cable. The electronic device includes an electronic chip providing a Cable ID and an Re-driver chip (a signal transponder/regenerator, which is configured to perform frequency characteristic compensation on an input signal attenuating due to transmission medium loss, and transmit the input signal, so as to improve an anti-interference capability and a remote transmission capability of the signal) enhancing data transmission quality.

In the conventional technology, there are in total four high speed differential pairs on the USB Type-C interface: TX1±, TX2±, RX1± and RX2±. By default, the four differential pairs can be used to transmit simultaneously at most two groups of USB3.1 data: TX1±/RX1± and TX2±/RX2±, and a highest data speed can reach 10 Gb/s. In a case that both an upstream device and a downstream device support Alternate Mode [3,4] (an alternate mode, which is a protocol for transmitting videos via the USB Type-C interface and cable, and includes DP Alt Mode formulated by the VESA organization and HDMI1.4b Alt Mode formulated by the HDMI Licensing LLC organization), the USB Type-C interface can also be used to transmit DP or HDMI video data. In this case, SBU1/SBU2 can carry AUX+/− signals in DP, and can also transmit Utility/HEAC+ and HPD/HEAC− signals in HDMI, according to the transmitted video protocol. D+/D− are always configured to transmit USB2.0 data, regardless of whether the upstream and downstream devices support the Alternate Mode [3,4]. The VBUS can provide or receive high power online electric power of 100 W (20V/5A) at most, thereby omitting an operation that a device is connected to an external power supply, and facilitating mobile applications. The Sideband Use (SBU) has different definitions in different Alt modes, and a specific definition of the SBU depends on a specific application in the present disclosure. For example, in an application of the HDMI1.4b Alt Mode, the SBU is configured to transmit HPD/Utility and HEAC+/− signals, and in an application of the DP Alt Mode, the SBU is configured to transmit AUX+/AUX− signals.

Figure 3:
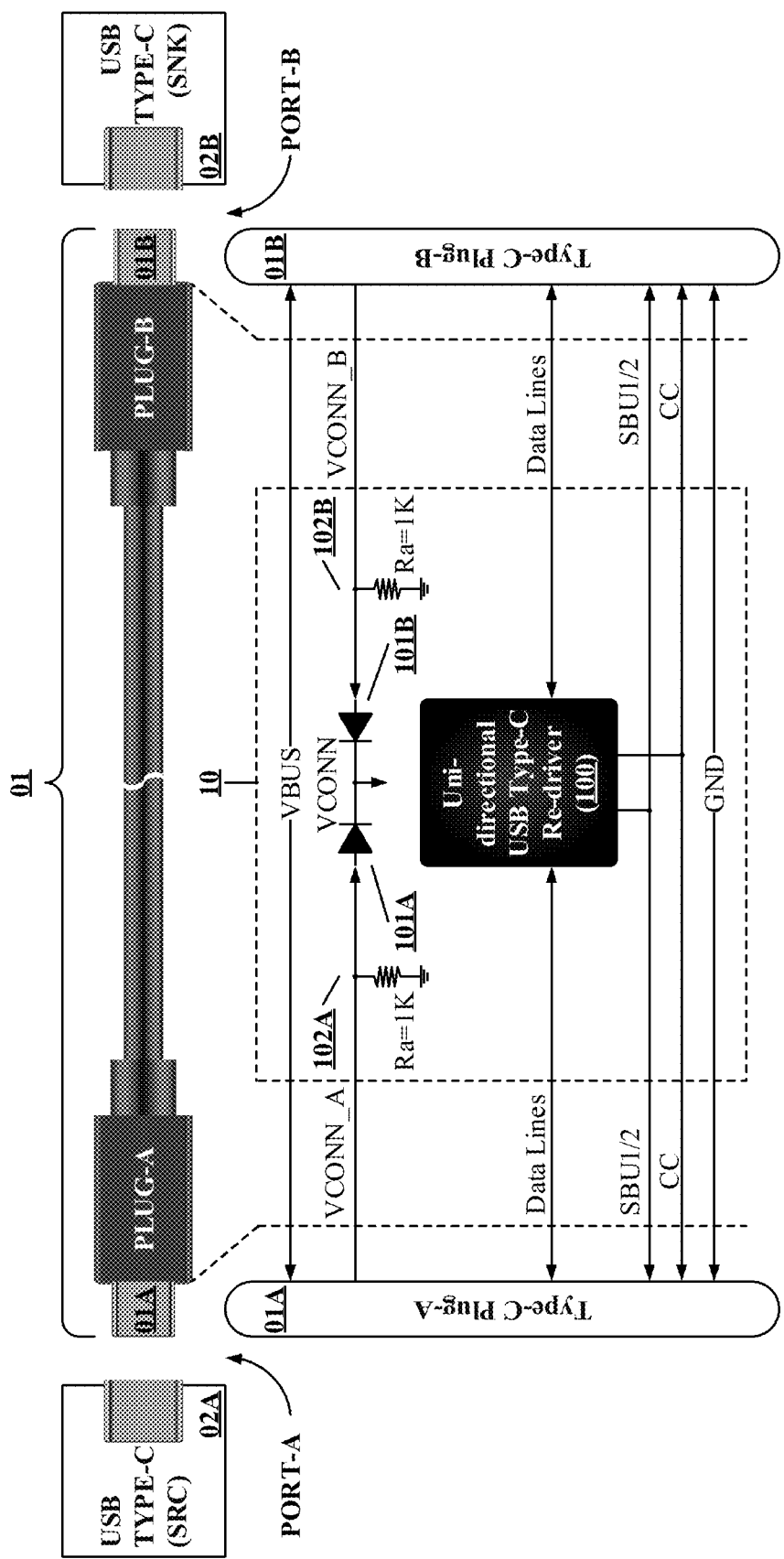
FIG. 3 is a schematic structural diagram of a USB Type-C active EMCA with unidirectional signal transmission according to the conventional technology.

FIG. 3 shows an example of a system to which a USB Type-C active EMCA with unidirectional signal transmission is applied. The system includes: a USB Type-C SRC 02A (SRC is usually a Type-C host for providing a signal source in a system of the USB Type-C interface, and in an initial state, the SRC supplies power to SNK or EMCA via the VBUS and the VCONN), a USB Type-C SNK 02B (SNK is usually a device connected to the Type-C host and configured to receive a signal, in the system of the USB Type-C interface, and in the initial state, the SNK draws a VBUS current from the SRC), and an active EMCA 01. The active EMCA 01 includes: a plug 01A at PORT-A, a plug 01B at PORT-B, a wire connecting the PORT-A and the PORT-B, and a Re-driver 100 buried at any position in the wire and including an e-Marker (an electronic identification chip, which is an electronic chip arranged in a USB Type-C FF cable and configured to store the Cable ID information and interact with a USB Type-C source) function, and a circuit board 10 constituted by auxiliary elements. The Re-driver 100 has functions of electronic identification and unidirectional signal regeneration, and is a heart of the active Electronic Marked Cable Assemblies (EMCA, which are fully functional USB Type-C cables integrating with the e-Marker chip and providing the identification information of the cable via the e-Marker), thereby providing a characteristic of the cable and improving transmission quality of a high speed data signal. 101A and 101B shown in FIG. 3 are two back-to-back isolation diodes, thereby ensuring that power is supplied to the Re-driver 100 once there is a voltage on either end in one aspect, and preventing electronic elements in the USB Type-C SRC 02A and the USB Type-C SNK 02B from being burnt when power are supplied to VCONN_A and VCONN_B simultaneously in another aspect.

After the cable connects the USB Type-C SRC 02A and the USB Type-C SNK 02B, in the initial state, the USB Type-C SRC 02A recognizes existence of a resistor Ra in FIG. 3 and supplies power on the VCONN_A, the Re-driver 100 acquires power from the VCONN_A and communicates with the USB Type-C SRC 02A, and provides the cable identification information (Cable ID for describing characteristics of the cable such as an electrical characteristic, a data rate, a transmission delay, a power level, and a firmware version, and information on whether the cable is a signal straight-through passive cable without high power supplying or a signal buffering active cable requiring high power supplying) to the USB Type-C SRC 02A. Thereafter, a connection between the USB Type-C SRC 02A and the USB Type-C SNK 02B is established following specifications [1]-[4], the Alternate Mode (Alt Mode) is determined, data channels are configured, and data is transmitted. For the USB Type-C active EMCA with the unidirectional signal transmission, a data transmission direction of the Re-driver 100 is fixed, such as from the PORT-A to the PORT-B, and the cable cannot be reversed for usage. Therefore, the cable has to be marked at a position close to a plug on a side of the plug 01A of the PORT-A, so as to inform the user of a correct connection terminal of the plug. In this case, it not only results in inconvenience for the user using the active USB Type-C EMCA, but also adds extra steps to make marks in production and manufacturing of the wire.

The specification [1] is: Universal Serial Bus Type-C Cable and Connector Specification R1.2, Mar. 25, 2016. The specification [2] is: Universal Serial Bus Power Delivery Specification R2.0, V1.0, Aug. 11, 2014. The specification [3] is: HDMI 1.4b Alt Mode on USB Type-C Specification v1.0, Sep. 15, 2016. The specification [4] is: VESA DisplayPort Alt Mode on USB Type-C Standard v1.0, Sep. 22, 2014.

In view of the above problems, according to the present disclosure, a real blind-plugging between the USB Type-C wire and any USB Type-C device is achieved, by adding necessary direction detection and recognition modules and in cooperation with programs, on the basis of the unidirectional transmission of the original active USB Type-C EMCA cable. Namely, not only either end of the cable can be connected to a device without distinguishing between forward and reverse plugging, but also both ends of the cable can be freely reversed and exchanged without distinguishing types of devices to be plugged in. In particular, according to the present disclosure, it is provided an implementation solution of a chip performing bidirectional signal transmission and automatic direction determination in the USB Type-C cable, and an active EMCA, thereby overcoming a shortcoming that a signal terminal needs to be distinguished in the traditional unidirectional active EMCA, and improving convenience and flexibility of using a split-type VR/AR product based on the USB Type-C interface.

Figure 4:
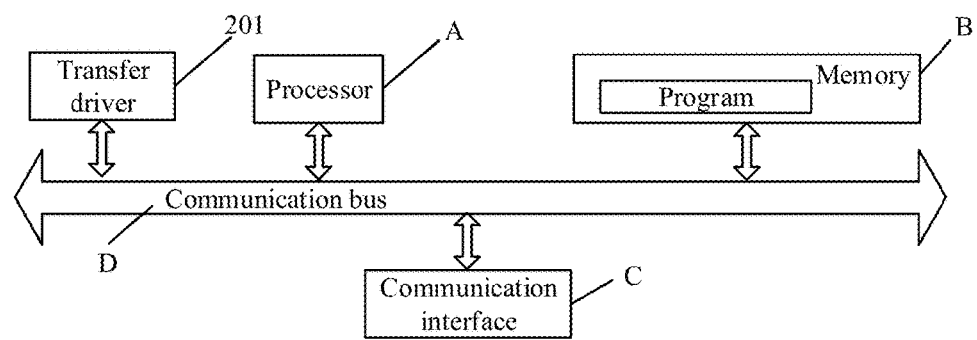
FIG. 4 is a schematic structural diagram of a bidirectional signal conditioning chip for a USB Type-C cable according to an embodiment of the present disclosure.

A bidirectional signal conditioning chip for the USB Type-C cable is provided according to the present disclosure. Referring to FIG. 4, the chip includes a memory A, a processor B and a transfer driver 201;

the bidirectional signal conditioning chip further includes a communication interface C and a communication bus D, where the memory A, the processor B, the communication interface C and the transfer driver 201 communicate with each other via the communication bus D.

The memory A is configured to store a program code, where the program code includes a computer operation instruction.

The memory A may include a high speed random access memory (RAM), and may further include a non-volatile memory, such as at least one flash memory.

The processor B may be a central processing unit (CPU), an application specific integrated circuit (ASIC), or one or more integrated circuits configured to implement an embodiment of the present disclosure.

The transfer driver 201 is configured to regenerate and transmit a high speed signal from a first end (USB Type-C SRC 02A) of the USB Type-C cable to a second end (USB Type-C SNK 02B) of the USB Type-C cable or from the second end of the USB Type-C cable to the first end of the USB Type-C cable.

The processor B is configured to call the program code stored in the memory A, and perform the following operations when the program code is executed:

determining a data transmission direction of the USB Type-C cable based on a detection signal inputted from an external circuit;

determining a type supported by transmitted data on the USB Type-C cable based on a detection result outputted from an external device;

configuring on-off states of buffers transmitting a data signal in the transfer driver based on the data transmission direction and the type supported by the transmitted data, and controlling a data output direction of the transfer driver to be consistent with the data transmission direction, so that a parameter configuration of the transfer driver is consistent with the type supported by the transmitted data, where each data transmission line in the bidirectional signal conditioning chip is provided with two buffers in opposite directions.

In a case that the USB Type-C cable provided with the bidirectional signal conditioning chip according to the above embodiment of the present disclosure is connected to a host and a device, the data transmission direction and the type supported by the transmitted data of the USB Type-C cable are detected via a circuit in a USB Type-C circuit board; a detection result of the direction and a detection result of the type are transmitted to the processor; the processor queries, according to a preset mapping rule, a configuration solution of the transfer driver matching the detection results of the direction and the type, after the processor obtains the detection results of the direction and the type; the on-off states of the buffers in the transfer driver are configured according to the configuration solution of the transfer driver, so that the data output direction of the transfer driver is consistent with the data transmission direction; and configuration parameters of the buffers in the transfer driver are configured according to the configuration solution of the transfer driver, so that parameter configurations of the buffers in the transfer driver are consistent with the type supported by the transmitted data. Therefore, with the USB Type-C cable, bidirectional transmission can be achieved, and a problem of inconvenience in usage for the user generated since the USB Type-C cable can only perform unidirectional data transmission in the conventional technology is solved.

Figure 5:
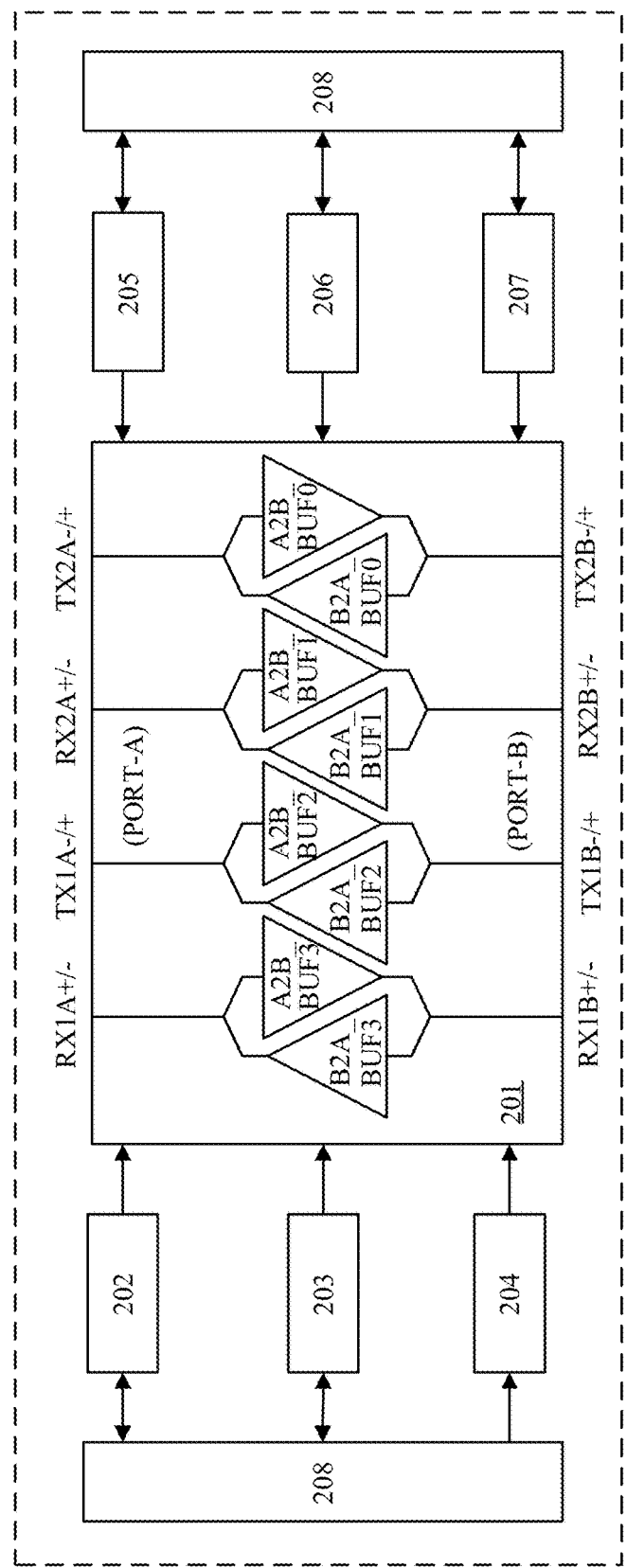
FIG. 5 is a schematic structural diagram of a bidirectional signal conditioning chip according to another embodiment of the present disclosure.

In the technical solution according to an embodiment of the present disclosure, a specific design of the transfer driver may be set according to requirements of the user, as long as the transfer driver can achieve bidirectional transmission. One specific design of the transfer driver is disclosed according to the present disclosure. Referring to FIG. 5, the transfer driver includes:

a first A buffer B2A_BUF0 and a first B buffer A2B_BUF0, arranged between a TX2A±high speed differential pair interface at a first end of the USB Type-C cable and a TX2B±high speed differential pair interface at a second end of the USB Type-C cable, where an input terminal of the first A buffer B2A_BUF0 is connected to the TX2B±high speed differential pair interface, an output terminal of the first A buffer B2A_BUF0 is connected to the TX2A±high speed differential pair interface, an input terminal of the first B buffer A2B_BUF0 is connected to the TX2A±high speed differential pair interface, and an output terminal of the first B buffer A2B_BUF0 is connected to the TX2B±high speed differential pair interface;

a second A buffer B2A_BUF1 and a second B buffer A2B_BUF1, arranged between an RX2A±high speed differential pair interface at the first end of the USB Type-C cable and an RX2B±high speed differential pair interface at the second end of the USB Type-C cable, where an input terminal of the second A buffer B2A_BUF1 is connected to the RX2B±high speed differential pair interface, an output terminal of the second A buffer B2A_BUF1 is connected to the RX2A±high speed differential pair interface, an input terminal of the second B buffer A2B_BUF1 is connected to the RX2A±high speed differential pair interface, and an output terminal of the second B buffer A2B_BUF1 is connected to the RX2B±high speed differential pair interface;

a third A buffer B2A_BUF2 and a third B buffer A2B_BUF2, arranged between a TX1A±high speed differential pair interface at the first end of the USB Type-C cable and a TX1B±high speed differential pair interface at the second end of the USB Type-C cable, where an input terminal of the third A buffer B2A_BUF2 is connected to the TX1B±high speed differential pair interface, an output terminal of the third A buffer B2A_BUF2 is connected to the TX1A±high speed differential pair interface, an input terminal of the third B buffer A2B_BUF2 is connected to the TX1A±high speed differential pair interface, and an output terminal of the third B buffer A2B_BUF2 is connected to the TX1B±high speed differential pair interface; and a fourth A buffer B2A_BUF3 and a fourth B buffer A2B_BUF3, arranged between an RX1A±high speed differential pair interface at the first end of the USB Type-C cable and an RX1B high speed differential pair interface at the second end of the USB Type-C cable, where an input terminal of the fourth A buffer B2A_BUF3 is connected to the RX1B±high speed differential pair interface, an output terminal of the fourth A buffer B2A_BUF3 is connected to the RX1A±high speed differential pair interface, an input terminal of the fourth B buffer A2B_BUF3 is connected to the RX1A±high speed differential pair interface, and an output terminal of the fourth B buffer A2B_BUF3 is connected to the RX1B±high speed differential pair interface.

In operation, operation states of the buffers in the transfer driver are different based on the different data transmission directions and the different types supported by the transmitted data. Specifically, the USB Type-C cable can transmit data of three types in an embodiment of the present disclosure. In a case that the data is USB3.1 data and the type supported by the transmitted data is detected to be not the Alt Mode, the type supported by the transmitted data is denoted as a first type. In a case that the type supported by the transmitted data is detected to be the HDMI1.4b Alt Mode, the type supported by the transmitted data is denoted as a second type. In a case that the type supported by the transmitted data is detected to be the DP Alt Mode, the type supported by the transmitted data is denoted as a third type. Practically, in a specific design, Pin Assignment of the USB Type-C cable may be set as multiple types of design. For example, the type of the Pin Assignment may be a C/E type disclosed in the specification [4], and may also be a D/F type disclosed in the specification [4]. In a case that designs of the Pin Assignment are different, the operation states of the buffers in the transfer driver are different, even if the types supported by the transmitted data are all the DP Alt Mode.

Specifically, the operation states of the buffers in the transfer driver in different modes may be referred to Table 1. In Table 1, a column of "direction" is used to indicate the data transmission direction, A indicates the first end of the USB Type-C cable, B indicates the second end of the USB Type-C cable, a column of "mode description" describes the mode of the transmitted data and the design of the Pin Assignment, BUF0-BUF3 in a column of "A2B" indicate the first B buffer to the fourth B buffer respectively, and BUF0-BUF3 in a column of "B2A" indicate the first A buffer to the fourth A buffer respectively.

TABLE 1

| Mode | Direction | Mode description | Enabled state (A2B_) | | | | Enabled state (B2A_) | | | |
| --- | --- | --- | --- | --- | --- | --- | --- | --- | --- | --- |
| | | | BUF 0 | BUF 1 | BUF 2 | BUF 3 | BUF 0 | BUF 1 | BUF 2 | BUF 3 |
| 000 | A→B | USB3.1 | on | off | on | off | off | on | off | on |
| 001 | | HDMI1.4b Alt Mode | on | on | on | on | off | off | off | off |
| 010 | | DP Alt Mode, Pin Assignment C/E | on | on | on | on | off | off | off | off |
| 011 | | DP Alt Mode, Pin Assignment D/F | on | on | on | off | off | off | off | on |
| 100 | B→A | USB3.1 | on | off | on | off | off | on | off | on |
| 101 | | HDMI1.4b Alt Mode | off | off | off | off | on | on | on | on |
| 110 | | DP Alt Mode, Pin Assignment C/E | off | off | off | off | on | on | on | on |
| 111 | | DP Alt Mode, Pin Assignment D/F | on | off | off | off | off | on | on | on |

Referring to Table 1, in a case that it is detected that data is transmitted from the first end of the USB Type-C cable to the second end of the USB Type-C cable, the processor performs following operations of:

controlling the first B buffer A2B_BUF0, the third B buffer A2B_BUF2, the second A buffer B2A_BUF1 and the fourth A buffer B2A_BUF3 to be turned on and other buffers to be turned off, if the type supported by the transmitted data is the USB3.1 data of the first type;

controlling the first B buffer A2B_BUF0, the second B buffer A2B_BUF1, the third B buffer A2B_BUF2 and the fourth B buffer A2B_BUF3 to be turned on and other buffers to be turned off, if the type supported by the transmitted data is the HDMI1.4b Alt Mode of the second type, or the type supported by the transmitted data is the DP Alt Mode of the third type and the type of Pin Assignment is the C/E type; and controlling the first B buffer A2B_BUF0, the second B buffer A2B_BUF1, the third B buffer A2B_BUF2, and the fourth A buffer B2A_BUF3 to be turned on and other buffers to be turned off, if the type supported by the transmitted data is the DP Alt Mode of the third type and the type of the Pin Assignment is the D/F type;

in a case that it is detected that the data is transmitted from the second end of the USB Type-C cable to the first end of the USB Type-C cable, the processor performs following operations of:

controlling the first B buffer A2B_BUF0, the third B buffer A2B_BUF2, the second A buffer B2A_BUF1 and the fourth A buffer B2A_BUF3 to be turned on and other buffers to be turned off, if the type supported by the transmitted data is the USB3.1 data of the first type;

controlling the first A buffer B2A_BUF0, the second A buffer B2A_BUF1, the third A buffer B2A_BUF2 and the fourth A buffer B2A_BUF3 to be turned on and other buffers to be turned off, if the type supported by the transmitted data is the MDMI1.4b Alt Mode of the second type or the type supported by the transmitted data is the DP Alt Mode of the third type and the type of the Pin Assignment is the C/E type; and controlling the first B buffer A2B_BUF0, the second A buffer B2A_BUF1, the third A buffer B2A_BUF2 and the fourth A buffer B2A_BUF3 to be turned on and other buffers to be turned off, if the type supported by the transmitted data is the DP Alt Mode of the third type and the type of the Pin Assignment is the D/F type.

In a technical solution according to another embodiment of the present disclosure, referring to FIG. 5, the bidirectional signal conditioning chip may further include: a power transmission protocol monitor 202 (USB PD, which is a protocol for power transmission and communication of USB formulated by the USB IF organization, and in the protocol, power up to 100 W (20V/5A) is allowed to be transmitted between USB devices, properties of a port such as power supplying/power reception and data transmission/data reception may be changed, and communication may be performed with a USB cable to acquire a property of the cable), a first listener 203 (CC listening), a register bank 204, a second listener 205 (AUX Listening), a third listener 206 (DDC Listening & Freq.Detect), a USB3.1 state machine 207, and an on-chip microprocessor 208 (OCM).

The power transmission protocol monitor 202 is configured to perform SOP'/SOP" communication with an SRC port or an SNK port according to a preset specification, so as to inform the SRC port or the SNK port of a characteristic of the cable. Specifically, the power transmission protocol monitor 202 performs the SOP'/SOP" communication with the SRC port or the SNK port according to the specification [2], so as to inform the SRC port or the SNK port of the characteristic of the cable, and the first listener 203 listens to communication content of the CC, thereby detecting the data type supported by the currently transmitted data and configuring the transfer driver in conjunction with a determination result of the data transmission direction. The SOP' is a USB PD communication data package starting with an SOP' sequence, is initiated by an end of the USB Type-C cable providing VCONN SRC and recognized and responded by the e-Marker chip in the USB Type-C EMCA cable. The SOP" is a USB PD communication data package starting with an SOP" sequence, is initiated by an end of the USB Type-C cable providing no VCONN SRC and recognized and responded by the e-Marker chip in the USB Type-C EMCA cable.

The first listener 203 is configured to listen to transmitted data of the configuration channel CC, determine a type supported by the transmitted data, and transmit the type supported by the transmitted data to the processor.

The register bank 204 is configured to configure operation parameters of modules in the bidirectional signal conditioning chip, and perform state storage, state acquisition, interrupt processing, and so on statically or dynamically.

The second listener 205 is configured to adjust configuration parameters of buffers in an enabled state in the transfer driver in a case that the type supported by the transmitted data is the third type, so that the configuration parameters of the buffers match the third type. Specifically, in a case that the type supported by the transmitted data is the DP Alt Mode, the second listener 205 listens to a process of main link training, and adjusts the parameters of the buffers in the enabled state, such as input equalization, an output amplitude and pre-emphasis, in a case that the type supported by the transmitted data is the DP Alt Mode, based on a result of the training.

The third listener 206 is configured to adjust the configuration parameters of the buffers in the enabled state in the transfer driver in a case that the type supported by the transmitted data is the second type, so that the configuration parameters of the buffers match the second type. Specifically, in a case that the type supported by the transmitted data is the HDMI1.4b Alt Mode, the third listener 206 listens to EDID, determines a clock frequency of a clock channel, and adjusts the parameters of the buffers BUF in the enabled state, such as input equalization, an output amplitude and pre-emphasis, in a case that the type supported by the transmitted data is the HDMI1.4b Alt Mode, based on the EDID and the clock frequency of the clock channel.

The USB3.1 state machine 207 is configured to control a USB3.1 interface to perform connection detection, state transition and data transmission, in a case that both DP Alt Mode data and USB3.1 data are transmitted or only the USB3.1 data is transmitted. Specifically, the USB3.1 state machine 207 controls the USB3.1 interface to perform connection detection, state transition and data transmission, in a case that the bidirectional signal conditioning chip transmits both the DP Alt Mode data and the USB3.1 data or transmits only the USB3.1 data.

The on-chip processor 208 is configured to run a pre-stored software program, and configure the operation parameters of the modules in the bidirectional signal conditioning chip, and perform state storage, state acquisition, and interrupt processing via the register bank statically or dynamically. The OCM 208 is configured to run the software program, configure the operation parameters of the modules, and perform state storage, state acquisition, interrupt processing, and so on via the register bank 204 statically or dynamically.

Hereinafter a specific operation process of the bidirectional signal conditioning chip is described.

After the chip is power on, first a voltage on the VCONN is detected by a detection circuit, and a detection result is transmitted to the processor. If a voltage is detected on VCONN_A, the processor records the data transmission direction as from the first end to the second end of the USB Type-C cable by setting a highest bit of a mode register as MODE<2>=0; if a voltage is detected on VCONN_B, the processor records the data transmission direction as from the second end to the first end of the USB Type-C cable by setting the highest bit of the mode register as MODE<2>=1; and if no voltage is detected on the VCONN_A and the VCONN_B, it is indicated that a current connection fails. After the VCONN is detected and the power transmission protocol monitor 202 interacts with the end providing the VCONN for the characteristic of the cable via the SOP'/SOP" communication, CC communication is performed between the USB Type-C SRC and the USB Type-C SNK, so as to establish the connection and determine the type supported by the transmitted data. In the process, the first listener 203 listens to a communication content of the CC in real time.

If no data of the Alt Mode type is monitored by the first listener 203, the processor controls the bidirectional signal conditioning chip to be in a default USB3.1 data transmission mode, configures low two bits of the mode register as MODE<1:0>=00, and configures the enabled states of the buffers in the transfer driver in conjunction with the previously recorded value of the highest bit MODE<2> of the mode register:

in a case that the data transmission direction is A→B, MODE<2>=0 and MODE<1:0>=00, an operation mode of the transfer driver is set as MODE=000; in this case, the buffers A2B_BUF0, A2B_BUF2, B2A_BUF1 and B2A_BUF3 in the transfer driver are controlled to be turned on, and other buffers are controlled to be turned off; or in a case that the data transmission direction is B→A, MODE<2>=1 and MODE<1:0>=00, the operation mode of the transfer driver is set as MODE=100; in this case, the buffers A2B_BUF0, A2B_BUF2, B2A_BUF1 and B2A_BUF3 in the transfer driver are controlled to be turned on, and other buffers are controlled to be turned off.

If the type supported by the data is monitored to be the HDMI1.4b Alt Mode, the processor controls the bidirectional signal conditioning chip to be in an HDMI1.4b video data transmission mode, configures low two bits of the mode register as MODE<1:0>=01, and configures the enabled states of the buffers in the transfer driver in conjunction with the previously recorded value of the highest bit MODE<2> of the mode register:

in a case that the data transmission direction is A→B, MODE<2>=0 and MODE<1:0>=01, the operation mode of the transfer driver is set as MODE=001; in this case, the buffers A2B_BUF0, A2B_BUF1, A2B_BUF2 and A2B_BUF3 in the transfer driver are controlled to be turned on, and other buffers are controlled to be turned off; or in a case that the data transmission direction is B→A, MODE<2>=1 and MODE<1:0>=01, the operation mode of the transfer driver is set as MODE=101; in this case, the buffers B2A_BUF0, B2A_BUF1, B2A_BUF2 and B2A_BUF3 in the transfer driver are controlled to be turned on and e other buffers are controlled to be turned off.

If the type supported by the data is monitored to be the DP Alt Mode and the Pin Assignment type is the C/E type disclosed in the specification [4], the bidirectional signal conditioning chip is controlled to be in a pure DP video data transmission mode, configures low two bits of the mode register as MODE<1:0>=10, and configures the enabled states of the buffers in the transfer driver in conjunction with the previously recorded value of the highest bit MODE<2> of the mode register:

in a case that the data transmission direction is A→B, MODE<2>=0 and MODE<1:0>=10, the operation mode of the transfer driver is set as MODE=010; in this case, the buffers A2B_BUF0, A2B_BUF1, A2B_BUF2 and A2B_BUF3 in the transfer driver are controlled to be turned on, and other buffers are controlled to be turned off; or in a case that the data transmission direction is B→A, MODE<2>=1 and MODE<1:0>=10, the operation mode of the transfer driver is set as MODE=110; in this case, the buffers B2A_BUF0, B2A_BUF1, B2A_BUF2 and B2A_BUF3 in the transfer driver are controlled to be turned on, and other buffers are controlled to be turned off.

If the type supported by the data is monitored to be the DP Alt Mode and the Pin Assignment type is the D/F type disclosed in the specification [4], the bidirectional signal conditioning chip is controlled to be in a DP+USB3.1 transmission mode, configures low two bits of the mode register as MODE<1:0>=11, and configures the enabled states of the buffers in the transfer driver in conjunction with the previously recorded value of the highest bit MODE<2> of the mode register:

in a case that the data transmission direction is A→B, MODE<2>=0 and MODE<1:0>=11, the operation mode of the transfer driver is set as MODE=011; in this case, the buffers A2B_BUF0, A2B_BUF1, A2B_BUF2 and B2A_BUF3 in the transfer driver are controlled to be turned on, and other buffers are controlled to be turned off; or in a case that the data transmission direction is B→A, MODE<2>=1 and MODE<1:0>=11, the operation mode of the transfer driver is set as MODE=111; in this case, the buffers A2B_BUF0, B2A_BUF1, B2A_BUF2 and B2A_BUF3 in the transfer driver are controlled to be turned on, and other buffers are controlled to be turned off.

Corresponding to the above bidirectional signal conditioning chip, a USB Type-C cable provided with the bidirectional signal conditioning chip according to any one of the above embodiments is further disclosed in the present disclosure. A circuit board of the USB Type-C cable is provided with the bidirectional signal conditioning chip 200 for the USB Type-C cable according to any one of the above embodiments.

Figure 6:
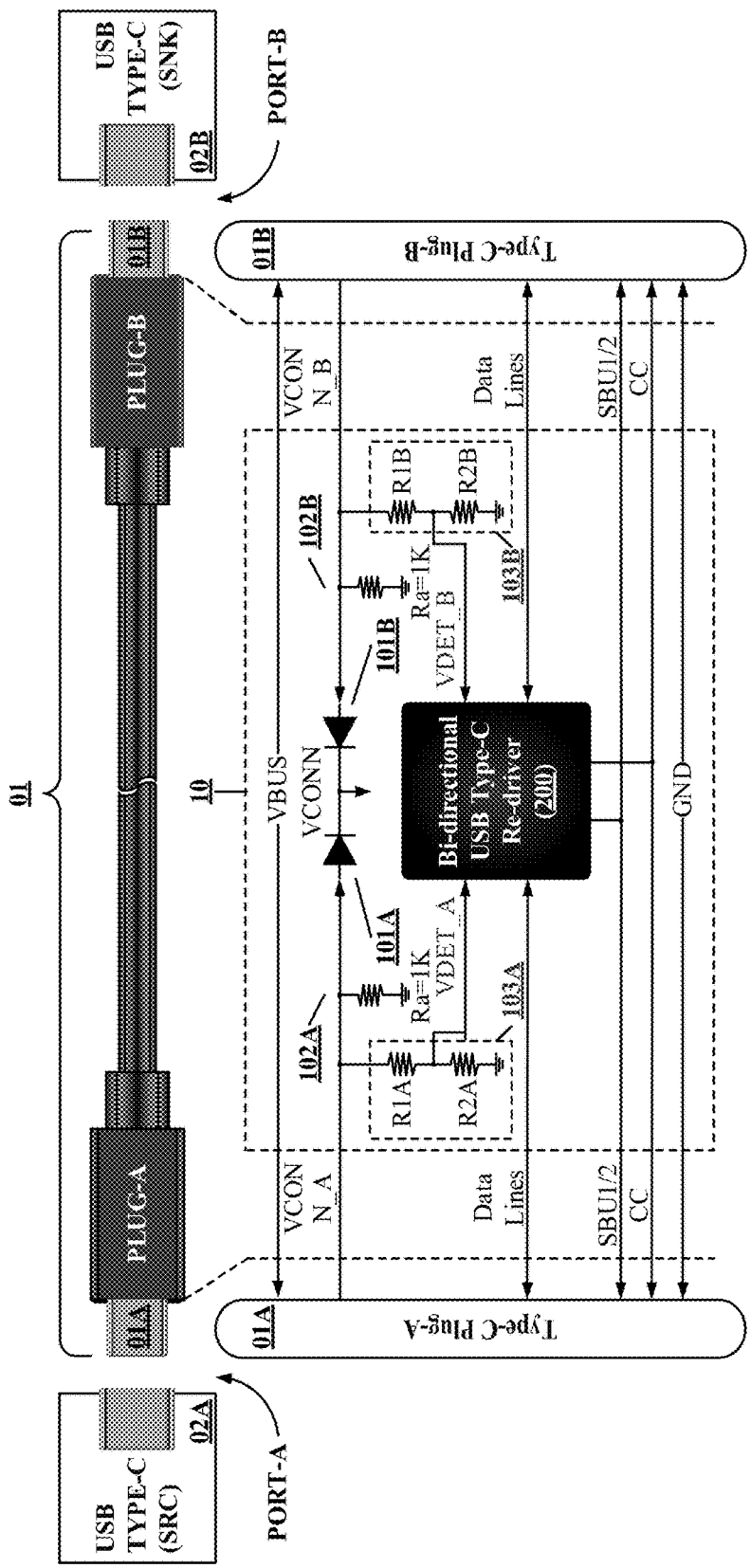
FIG. 6 is a schematic structural diagram of a USB Type-C cable according to an embodiment of the present disclosure.

To facilitate determination of the data transmission direction, reference is made to FIG. 6, the USB Type-C cable according to the above embodiment of the present disclosure is further provided with a first voltage sampling circuit 103A and a second voltage sampling circuit 103B. The first voltage sampling circuit 103A and the second voltage sampling circuit 103B are configured to detect a voltage on the VCONN.

The first voltage sampling circuit 103A is configured to detect whether there is a voltage on the VCONN_A. In a case that the voltage is detected on the VCONN_A, it is indicated that data is transmitted from the first end to the second end of the USB Type-C cable, and the first voltage sampling circuit 103A outputs a high level signal to the processor.

The second voltage sampling circuit 103B is configured to detect whether there is a voltage on the VCONN_B. In a case that the voltage is detected on the VCONN_B, it is indicated that the data is transmitted from the second end to the first end of the USB Type-C cable, and the second voltage sampling circuit 103B outputs a high level signal to the processor.

The processor determines that the data is transmitted from the first end to the second end of the USB Type-C cable in a case that the high level signal outputted from the first voltage sampling circuit 103A is obtained by the processor. The processor determines that the data is transmitted from the second end to the first end of the USB Type-C cable in a case that the high level signal outputted from the second voltage sampling circuit 103B is obtained by the processor.

Specifically, specific designs of the first voltage sampling circuit 103A and the second voltage sampling circuit 103B may be set based on requirements of the user, as long as the voltage sampling circuits can detect whether there is a voltage on the VCONN_A and the VCONN_B and output corresponding voltage signals. Specifically, reference is made to FIG. 6, and the first voltage sampling circuit 103A may include:

a first A resistor R1A connected to a first isolation diode 101A, where the first isolation diode 101A is one diode of two back-to-back isolation diodes in the circuit board of the USB Type-C cable, and is turned on from the first end of the USB Type-C cable to the second end of the USB Type-C cable, and an input end terminal of the first isolation diode 101A is connected to the VCONN_A; and a second A resistor R2A, where a first terminal of the second A resistor R2A is connected to the first A resistor R1A, a second terminal of the second A resistor R2A is grounded, and a common terminal of the first A resistor R1A and the second A resistor R2A serves as an output terminal of the first voltage sampling circuit 103A.

The second voltage sampling circuit 103B includes:

a first B resistor R1B connected to a second isolation diode 101B, where the second isolation diode 101B is the other diode of the two back-to-back isolation diodes in the circuit board of the USB Type-C cable, and is turned on from the second end of the USB Type-C cable to the first end of the USB Type-C cable, namely, an input terminal of the second isolation diode 101B is connected to the VCONN_B, and an output terminal of the second isolation diode 101B is connected to an output terminal of the first isolation diode 101A; and a second B resistor R2B, where a first terminal of the second B resistor R2B is connected to the first B resistor R1B, a second terminal of the second B resistor R2B is grounded, and a common terminal of the first B resistor R1B and the second B resistor R2B serves as an output terminal of the second voltage sampling circuit 103B.

In a case that the VCONN_A is power on, there is a voltage on the common terminal of the first A resistor R1A and the second A resistor R2A, and the common terminal outputs a high level signal to the processor. In a case that the VCONN_B is power on, there is a voltage on the common terminal of the first B resistor R1B and the second B resistor R2B, and the common terminal outputs a high level signal to the processor.

In design of the circuits, the first voltage sampling circuit 103A and/or the second voltage sampling circuit 103B may be arranged independently from the bidirectional signal conditioning chip, or may also be integrated in the bidirectional signal conditioning chip.

In the technical solution according to an embodiment of the present disclosure, both the first end and the second end of the USB Type-C cable are Type-C plugs.

Figure 7:
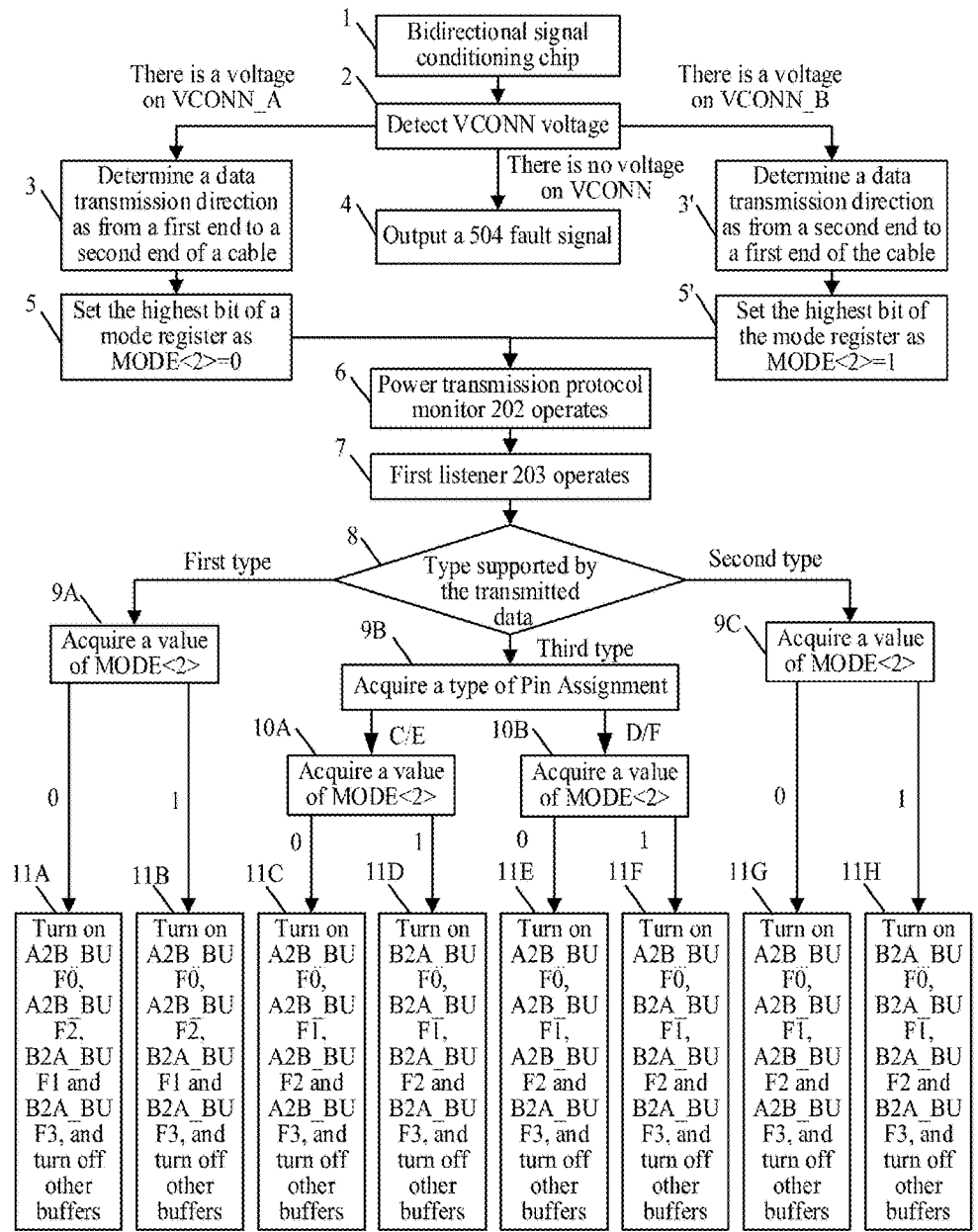
FIG. 7 is a schematic flowchart of an operation of a bidirectional signal conditioning chip.

Hereinafter a specific implementation flow of the technical solution according to the present disclosure is illustrated in the embodiment, and reference is made to FIG. 7.

In step 1, step 2 is performed in a case that the bidirectional signal conditioning chip is monitored.

In step 2, a VCONN voltage is detected by the first voltage sampling circuit and the second voltage sampling circuit; step 3 is performed in a case that a voltage is detected on the VCONN_A; step 3' is performed in a case that a voltage is detected on the VCONN_B; or step 4 is performed in a case that no voltage is detected on both the VCONN_A and the VCONN_B.

In step 3, the data transmission direction is determined as from the first end to the second end of the USB Type-C cable, and step 5 is performed.

In step 3', the data transmission direction is determined as from the second end to the first end of the USB Type-C cable, and step 5' is performed.

In step 4, a 504 fault signal is outputted.

In step 5, the highest bit of the mode register is set as MODE<2>=0, and step 6 is performed.

In step 5', the highest bit of the mode register is set as MODE<2>=1, and step 6 is performed.

In step 6, the power transmission protocol monitor 202 operates, and step 7 is performed.

In step 7, the first listener 203 operates, and step 8 is performed.

In step 8, a type supported by the transmitted data is determined, and step 9A is performed in a case that the supported type is the first type, step 9B is performed in a case that the supported type is the third type, or step 9C is performed in a case that the supported type is the second type.

In step 9A, it is determined whether MODE<2>=0 or MODE<2>=1, and step 11A is performed in a case that MODE<2>=0, or step 11B is performed in a case that MODE<2>=1.

In step 11A, the buffers A2B_BUF0, A2B_BUF2, B2A_BUF1 and B2A_BUF3 in the transfer driver are controlled to be turned on, and other buffers are controlled to be turned off In step 11B, the buffers A2B_BUF0, A2B_BUF2, B2A_BUF1 and B2A_BUF3 in the transfer driver are controlled to be turned on, and other buffers are controlled to be turned off In step 9B, it is determined whether a type of the Pin Assignment is the C/E type or the D/F type, and step 10A is performed in case of the C/E type, or step 10B is performed in case of the D/F type.

In step 10A, it is determined whether MODE<2>=0 or MODE<2>=1, and step 11C is performed in a case that MODE<2>=0, or step 11D is performed in a case that MODE<2>=1.

In step 10B, it is determined whether MODE<2>=0 or MODE<2>=1, and step 11E is performed in a case that MODE<2>=0, or step 11F is performed in a case that MODE<2>=1.

In step 11C, the buffers A2B_BUF0, A2B_BUF1, A2B_BUF2 and A2B_BUF3 in the transfer driver are controlled to be turned on, and other buffers are controlled to be turned off In step 11D, the buffers B2A_BUF0, B2A_BUF1, B2A_BUF2 and B2A_BUF3 in the transfer driver are controlled to be turned on, and other buffers are controlled to be turned off In step 11E, the buffers A2B_BUF0, A2B_BUF1, A2B_BUF2 and B2A_BUF3 in the transfer driver are controlled to be turned on, and other buffers are controlled to be turned off In step 11F, the buffers A2B_BUF0, B2A_BUF1, B2A_BUF2 and B2A_BUF3 in the transfer driver are controlled to be turned on, and other buffers are controlled to be turned off In step 9C, it is determined whether MODE<2>=0 or MODE<2>=1, and step 11G is performed in a case that MODE<2>=0, or step 11H is performed in a case that MODE<2>=1.

In step 11G the buffers A2B_BUF0, A2B_BUF1, A2B_BUF2 and A2B_BUF3 in the transfer driver are controlled to be turned on, and other buffers are controlled to be turned off In step 11H, the buffers B2A_BUF0, B2A_BUF1, B2A_BUF2 and B2A_BUF3 in the transfer driver are controlled to be turned on, and other buffers are controlled to be turned off It should be noted that, each English name listed in the summary and the drawings of the present disclosure is a common term for those skilled in the art, and those skilled in the art can clearly understand the meaning of each English name in the present disclosure in a case that they have basic specialized technical knowledge.

For convenience of description, the above systems are divided into various modules according to functions. Apparently, the functions of the various modules may be implemented in one or more software and/or hardware, when the present disclosure is implemented.

The embodiments of the present disclosure are described in a progressive manner, the same or similar parts among the embodiments can be referred to each other, and each embodiment places emphasis on the difference from other embodiments. In particular, for the system or the embodiment of the system, since they are similar to the embodiment of the method, the description of the system or the embodiment of the system is simple, and reference may be made to the relevant part of the embodiment of the method. The above-described system and the embodiments of the system are only schematic. A unit described as a separated component may be physically separated or not. Components shown as units may be physical units or not, i.e. the components may be located in one place or may be distributed onto multiple network units. A part or all of the modules may be chosen as required to achieve the object of the solution of the embodiment. Those skilled in the art can understand and implement the disclosure without creative efforts.

Those skilled in the art can further realize that the units and the algorithm steps of the examples described in conjunction with the embodiments disclosed herein, may be implemented by electronic hardware, computer software, or a combination thereof. To illustrate interchangeability between the hardware and the software clearly, the composition and the steps of each of the examples are generally described according to functions in the above illustration. Whether the functions being performed by hardware or software depends on a specific application and a design constraint condition of the technical solution. Those skilled in the art can implement the described functions using different methods for each of the specific applications, however, the implementation should not be considered to go beyond the scope of the present disclosure.

The steps of the method or the algorithm described in conjunction with the embodiments disclosed herein can be implemented directly by hardware, a software module executed by the processor, or a combination thereof. The software module may be stored in a Random Access Memory (RAM), a memory, a Read-Only Memory (ROM), an electrical programmable ROM, an electrically erasable programmable ROM, a register, a hardware disk, a removable magnetic disk, a CD-ROM, or any other forms of storage medium well known in the art.

It should be noted that, the relationship terms such as "first", "second" and the like are only used herein to distinguish one entity or an operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements, but also other elements that are not clearly enumerated, or further include inherent elements of the process, the method, the article, or the device. Unless expressively limited, the statement "including a . . . " does not exclude the case that other similar elements may exist in the process, the method, the article or the device other than enumerated elements.

The above description of the embodiments herein enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure is not limited to the embodiments described herein but is to conform to the widest scope consistent with the principles and novel features disclosed herein.

The invention claimed is:

1. A bidirectional signal conditioning chip for a USB Type-C cable, comprising:
    a memory configured to store a program code;
    a transfer driver configured to regenerate and transmit a high speed signal from a first end of the USB Type-C cable to a second end of the USB Type-C cable or from the second end of the USB Type-C cable to the first end of the USB Type-C cable; and
    a processor configured to call the program code and configured to perform, when the program code is executed, operations of:
    determining a data transmission direction of the USB Type-C cable;
    determining a type supported by transmitted data on the USB Type-C cable; and
    configuring on-off states of buffers transmitting a data signal in the transfer driver based on the data transmission direction and the type supported by the transmitted data, to control a data output direction of the transfer driver to be consistent with the data transmission direction,
    wherein each data transmission line in the bidirectional signal conditioning chip is provided with two buffers in opposite directions.

2. The bidirectional signal conditioning chip for the USB Type-C cable according to claim 1, wherein the transfer driver comprises:
    a first A buffer and a first B buffer, arranged between a TX2A±high speed differential pair interface at the first end of the USB Type-C cable and a TX2B±high speed differential pair interface at the second end of the USB Type-C cable, wherein an input terminal of the first A buffer is connected to the TX2B±high speed differential pair interface, an output terminal of the first A buffer is connected to the TX2A±high speed differential pair interface, an input terminal of the first B buffer is connected to the TX2A±high speed differential pair interface, and an output terminal of the first B buffer is connected to the TX2B±high speed differential pair interface;
    a second A buffer and a second B buffer, arranged between an RX2A±high speed differential pair interface at the first end of the USB Type-C cable and an RX2B±high speed differential pair interface at the second end of the USB Type-C cable, wherein an input terminal of the second A buffer is connected to the RX2B±high speed differential pair interface, an output terminal of the second A buffer is connected to the RX2A±high speed differential pair interface, an input terminal of the second B buffer is connected to the RX2A±high speed differential pair interface, and an output terminal of the second B buffer is connected to the RX2B±high speed differential pair interface;
    a third A buffer and a third B buffer, arranged between a TX1A±high speed differential pair interface at the first end of the USB Type-C cable and a TX1B±high speed differential pair interface at the second end of the USB Type-C cable, wherein an input terminal of the third A buffer is connected to the TX1B±high speed differential pair interface, an output terminal of the third A buffer is connected to the TX1A±high speed differential pair interface, an input terminal of the third B buffer is connected to the TX1A±high speed differential pair interface, and an output terminal of the third B buffer is connected to the TX1B±high speed differential pair interface; and a fourth A buffer and a fourth B buffer, arranged between an RX1A±high speed differential pair interface at the first end of the USB Type-C cable and an RX1B±high speed differential pair interface at the second end of the USB Type-C cable, wherein an input terminal of the fourth A buffer is connected to the RX1B±high speed differential pair interface, an output terminal of the fourth A buffer is connected to the RX1A±high speed differential pair interface, an input terminal of the fourth B buffer is connected to the RX1A±high speed differential pair interface, and an output terminal of the fourth B buffer is connected to the RX1B±high speed differential pair interface.

3. A USB Type-C cable provided with the bidirectional signal conditioning chip for the USB Type-C cable according to claim 1.

4. The USB Type-C cable according to claim 3, wherein both the first end and the second end of the USB Type-C cable are Type-C plugs.

5. The bidirectional signal conditioning chip for the USB Type-C cable according to claim 2, wherein, for configuring the on-off states of the buffers transmitting the data signal in the transfer driver based on the data transmission direction and the type supported by the transmitted data, the processor is configured to perform operations of:

in a case that it is detected that data is transmitted from the first end of the USB Type-C cable to the second end of the USB Type-C cable, controlling the first B buffer, the third B buffer, the second A buffer and the fourth A buffer to be turned on and other buffers to be turned off if the type supported by the transmitted data is a first type; controlling the first B buffer, the second B buffer, the third B buffer and the fourth B buffer to be turned on and other buffers to be turned off if the type supported by the transmitted data is a second type, or the type supported by the transmitted data is a third type and a type of Pin Assignment is a C/E type; and controlling the first B buffer, the second B buffer, the third B buffer and the fourth A buffer to be turned on and other buffers to be turned off if the type supported by the transmitted data is the third type and the type of the Pin Assignment is a D/F type; and in a case that it is detected that the data is transmitted from the second end of the USB Type-C cable to the first end of the USB Type-C cable, controlling the first B buffer, the third B buffer, the second A buffer and the fourth A buffer to be turned on and other buffers to be turned off if the type supported by the transmitted data is the first type; controlling the first A buffer, the second A buffer, the third A buffer and the fourth A buffer to be turned on and other buffers to be turned off if the type supported by the transmitted data is the second type, or the type supported by the transmitted data is the third type and the type of the Pin Assignment is the C/E type; and controlling the first B buffer, the second A buffer, the third A buffer and the fourth A buffer to be turned on and other buffers to be turned off if the type supported by the transmitted data is the third type and the type of the Pin Assignment is the D/F type.

6. The bidirectional signal conditioning chip for the USB Type-C cable according to claim 2, wherein the second type is an HDMI1.4b Alt Mode, the third type is a DP Alt Mode, and the first type is a type other than the HDMI1.4b Alt Mode and the DP Alt Mode.

7. The bidirectional signal conditioning chip for the USB Type-C cable according to claim 2, further comprising:

a power transmission protocol monitor configured to perform SOP'/SOP" communication with an SRC port or an SNK port according to a preset specification, to inform the SRC port or the SNK port of a characteristic of the cable;

a first listener configured to listen to transmitted data of a configuration channel, determine a type supported by the transmitted data, and transmit the type supported by the transmitted data to the processor;

a register set configured to configure operation parameters of modules in the bidirectional signal conditioning chip, and perform state storage, state acquisition, and interrupt processing statically or dynamically;

a second listener configured to adjust configuration parameters of buffers in an enabled state in the transfer driver in a case that the type supported by the transmitted data is the third type, to control the configuration parameters of the buffers to match the third type;

a third listener configured to adjust the configuration parameters of the buffers in the enabled state in the transfer driver in a case that the type supported by the transmitted data is the second type, to control the configuration parameters of the buffers to match the second type;

a USB3.1 state machine configured to control a USB3.1 interface to perform connection detection, state transition and data transmission, in a case that both DP Alt Mode data and USB3.1 data are transmitted or only the USB3.1 data is transmitted; and an on-chip processor configured to run a pre-stored software program, and configure the operation parameters of the modules in the bidirectional signal conditioning chip and perform state storage, state acquisition, and interrupt processing via the register set statically or dynamically.

8. The USB Type-C cable according to claim 3, wherein the transfer driver comprises:

a first A buffer and a first B buffer, arranged between a TX2A±high speed differential pair interface at the first end of the USB Type-C cable and a TX2B±high speed differential pair interface at the second end of the USB Type-C cable, wherein an input terminal of the first A buffer is connected to the TX2B±high speed differential pair interface, an output terminal of the first A buffer is connected to the TX2A±high speed differential pair interface, an input terminal of the first B buffer is connected to the TX2A±high speed differential pair interface, and an output terminal of the first B buffer is connected to the TX2B±high speed differential pair interface;

a second A buffer and a second B buffer, arranged between an RX2A±high speed differential pair interface at the first end of the USB Type-C cable and an RX2B±high speed differential pair interface at the second end of the USB Type-C cable, wherein an input terminal of the second A buffer is connected to the RX2B±high speed differential pair interface, an output terminal of the second A buffer is connected to the RX2A±high speed differential pair interface, an input terminal of the second B buffer is connected to the RX2A±high speed differential pair interface, and an output terminal of the second B buffer is connected to the RX2B±high speed differential pair interface;

a third A buffer and a third B buffer, arranged between a TX1A±high speed differential pair interface at the first end of the USB Type-C cable and a TX1B±high speed differential pair interface at the second end of the USB Type-C cable, wherein an input terminal of the third A buffer is connected to the TX1B±high speed differential pair interface, an output terminal of the third A buffer is connected to the TX1A±high speed differential pair interface, an input terminal of the third B buffer is connected to the TX1A±high speed differential pair interface, and an output terminal of the third B buffer is connected to the TX1B±high speed differential pair interface; and a fourth A buffer and a fourth B buffer, arranged between an RX1A±high speed differential pair interface at the first end of the USB Type-C cable and an RX1B±high speed differential pair interface at the second end of the USB Type-C cable, wherein an input terminal of the fourth A buffer is connected to the RX1B±high speed differential pair interface, an output terminal of the fourth A buffer is connected to the RX1A±high speed differential pair interface, an input terminal of the fourth B buffer is connected to the RX1A±high speed differential pair interface, and an output terminal of the fourth B buffer is connected to the RX1B±high speed differential pair interface.

9. The USB Type-C cable according to claim 3, further comprising:

a first voltage sampling circuit and a second voltage sampling circuit, wherein the first voltage sampling circuit is configured to output a high level signal to the processor in a case that data is transmitted from the first end of the USB Type-C cable to the second end of the USB Type-C cable; and the second voltage sampling circuit is configured to output a high level signal to the processor in a case that the data is transmitted from the second end of the USB Type-C cable to the first end of the USB Type-C cable.

10. The USB Type-C cable according to claim 8, wherein, for configuring the on-off states of the buffers transmitting the data signal in the transfer driver based on the data transmission direction and the type supported by the transmitted data, the processor is configured to perform operations of:

in a case that it is detected that data is transmitted from the first end of the USB Type-C cable to the second end of the USB Type-C cable, controlling the first B buffer, the third B buffer, the second A buffer and the fourth A buffer to be turned on and other buffers to be turned off if the type supported by the transmitted data is a first type; controlling the first B buffer, the second B buffer, the third B buffer and the fourth B buffer to be turned on and other buffers to be turned off if the type supported by the transmitted data is a second type, or the type supported by the transmitted data is a third type and a type of Pin Assignment is a C/E type; and controlling the first B buffer, the second B buffer, the third B buffer and the fourth A buffer to be turned on and other buffers to be turned off if the type supported by the transmitted data is the third type and the type of the Pin Assignment is a D/F type; and in a case that it is detected that the data is transmitted from the second end of the USB Type-C cable to the first end of the USB Type-C cable, controlling the first B buffer, the third B buffer, the second A buffer and the fourth A buffer to be turned on and other buffers to be turned off if the type supported by the transmitted data is the first type; controlling the first A buffer, the second A buffer, the third A buffer and the fourth A buffer to be turned on and other buffers to be turned off if the type supported by the transmitted data is the second type, or the type supported by the transmitted data is the third type and the type of the Pin Assignment is the C/E type; and controlling the first B buffer, the second A buffer, the third A buffer and the fourth A buffer to be turned on and other buffers to be turned off if the type supported by the transmitted data is the third type and the type of the Pin Assignment is the D/F type.

11. The USB Type-C cable according to claim 8, wherein the second type is an HDMI1.4b Alt Mode, the third type is a DP Alt Mode, and the first type is a type other than the HDMI1.4b Alt Mode and the DP Alt Mode.

12. The USB Type-C cable according to claim 8, wherein the bidirectional signal conditioning chip for the USB Type-C cable further comprises:

a power transmission protocol monitor configured to perform SOP'/SOP" communication with an SRC port or an SNK port according to a preset specification, to inform the SRC port or the SNK port of a characteristic of the cable;

a first listener configured to listen to transmitted data of a configuration channel, determine a type supported by the transmitted data, and transmit the type supported by the transmitted data to the processor;

a register set configured to configure operation parameters of modules in the bidirectional signal conditioning chip, and perform state storage, state acquisition, and interrupt processing statically or dynamically;

a second listener configured to adjust configuration parameters of buffers in an enabled state in the transfer driver in a case that the type supported by the transmitted data is the third type, to control the configuration parameters of the buffers to match the third type;

a third listener configured to adjust the configuration parameters of the buffers in the enabled state in the transfer driver in a case that the type supported by the transmitted data is the second type, to control the configuration parameters of the buffers to match the second type;

a USB3.1 state machine configured to control a USB3.1 interface to perform connection detection, state transition and data transmission, in a case that both DP Alt Mode data and USB3.1 data are transmitted or only the USB3.1 data is transmitted; and an on-chip processor configured to run a pre-stored software program, and configure the operation parameters of the modules in the bidirectional signal conditioning chip and perform state storage, state acquisition, and interrupt processing via the register set statically or dynamically.

13. The USB Type-C cable according to claim 9, wherein the first voltage sampling circuit comprises:

a first A resistor connected to a first isolation diode, wherein the first isolation diode is one diode of two back-to-back isolation diodes in the circuit board of the USB Type-C cable, and is turned on from the first end of the USB Type-C cable to the second end of the USB Type-C cable; and a second A resistor, wherein a first terminal of the second A resistor is connected to the first A resistor, a second terminal of the second A resistor is grounded, and a common terminal of the first A resistor and the second A resistor serves as an output terminal of the first voltage sampling circuit;

and the second voltage sampling circuit comprises:

a first B resistor connected to a second isolation diode, wherein the second isolation diode is one diode of the two back-to-back isolation diodes in the circuit board of the USB Type-C cable, and is turned on from the second end of the USB Type-C cable to the first end of the USB Type-C cable; and a second B resistor, wherein a first terminal of the second B resistor is connected to the first B resistor, a second terminal of the second B resistor is grounded, and a common terminal of the first B resistor and the second B resistor serves as an output terminal of the second voltage sampling circuit.

14. The USB Type-C cable according to claim 9, wherein at least one of the first voltage sampling circuit and the second voltage sampling circuit is integrated in the bidirectional signal conditioning chip.

15. The USB Type-C cable according to claim 13, wherein at least one of the first voltage sampling circuit and the second voltage sampling circuit is integrated in the bidirectional signal conditioning chip.

* * * * *